Sept. 18, 1928.                J. W. BELL                1,684,788
INCLINATION INDICATOR
Filed Sept. 25, 1924
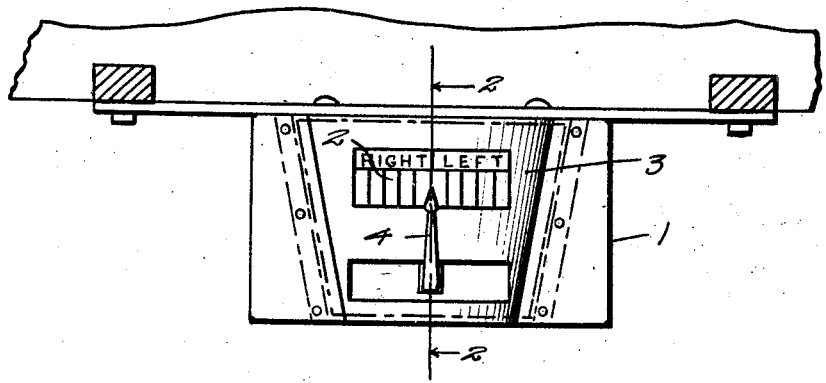
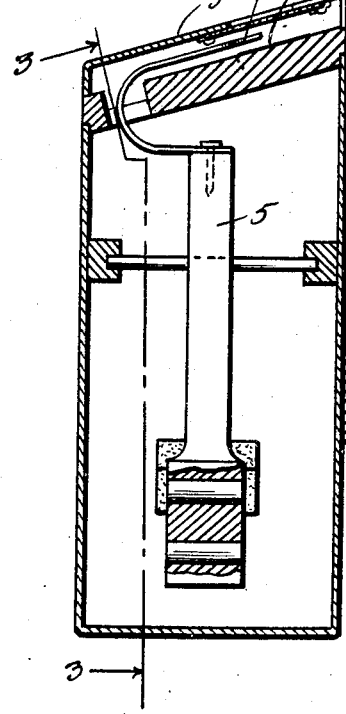
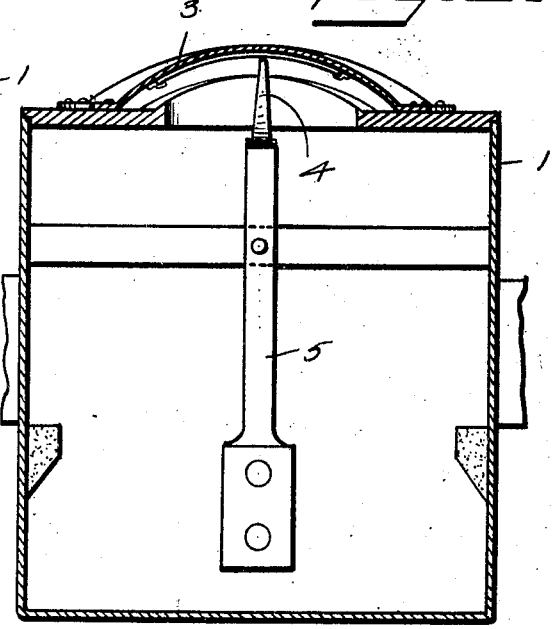
Inventor
J. W. Bell Patented Sept. 18, 1928.

1,684,788

UNITED STATES PATENT OFFICE.

JOHN W. BELL, OF OGDENSBURG, NEW YORK.

INCLINATION INDICATOR.

Application filed September 25, 1924. Serial No. 739,910.

The object of this invention is to provide an indicator for vehicles or wagons or other carrier so that the load may be uniformly distributed and the body prevented from leaning to one side or the other and in its specific adaptation the invention is particularly designed to be applied to a farm wagon for transporting hay or like commodity.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the specification,

Figure 1 is a detail view showing the application of the invention,

Figure 2 is a detail view of the indicator, and

Figure 3 is a sectional view thereof on the line 3—3 of Figure 2.

Corresponding and like parts are referred to in the following description and designated in the several views of the drawings by like reference characters.

The indicator comprises a frame 1 which is hollow and of the nature of a case, the same being provided with scale graduations 2 which are protected by a cover 3 in which is formed an opening to admit of ready observation of the scale and the pointer 4 in cooperative relation therewith. A pendulum 5 is pivotally mounted within the frame 1 and the pointer 4 is attached to the upper end thereof and is arranged to move over the scale 2 which is graduated from a central point toward opposite ends. When the pointer 4 occupies a point midway between the extremities of the scale the vehicle is balanced and in the event of the vehicle being loaded to a greater extent upon one side or the other, the pointer moves with reference to the scale and designates the side containing the excess of load so that the opposite side may have its load increased to insure a balance.

The indicating mechanism may be of any preferred construction and located at any convenient or determinate point and when applied to a hay wagon is attached to the hay ladder as indicated in Figure 1.

What is claimed is:—

A device of the class described comprising a casing, a pendulum journaled within the casing substantially midway of the ends thereof, an inclined wall adjacent the top of the casing provided with a scale, said wall having an opening therethrough nearer one side than the other side, a substantially horizontally disposed U-shaped pointer, the bridge of said pointer extending through said opening and the terminals being disposed on opposite sides of said wall, the lower terminal being attached to the top of said pendulum out of line with said opening, the other terminal extending over said inclined wall, the latter terminal being deflected away from the first terminal to accord with the inclination of the wall and a cover on said inclined wall covering said opening, said cover being provided with an opening disalined with the aforesaid opening through which the pointer may be observed.

In testimony whereof I affix my signature.

JOHN W. BELL.